United States Patent
Stahl et al.

(10) Patent No.: US 10,792,838 B2
(45) Date of Patent: Oct. 6, 2020

(54) SYSTEM AND METHOD FOR THE CONTINUOUS PRODUCTION OF CURVED PREFORMS

(71) Applicant: Deutsches Zentrum für Luft- und Raumfahrt e.V., Köln (DE)

(72) Inventors: Arne Stahl, Braunschweig (DE); Henrik Borgwardt, Salzgitter (DE); Sascha Dehn, Braunschweig (DE)

(73) Assignee: DEUTSCHES ZENTRUM FUER LUFT- UND RAUMFAHRT E.V., Cologne (DE)

(*) Notice: Subject to any disclaimer, the term of this patent is extended or adjusted under 35 U.S.C. 154(b) by 362 days.

(21) Appl. No.: 15/523,011

(22) PCT Filed: Nov. 5, 2015

(86) PCT No.: PCT/EP2015/075823
§ 371 (c)(1),
(2) Date: Apr. 28, 2017

(87) PCT Pub. No.: WO2016/071451
PCT Pub. Date: May 12, 2016

(65) Prior Publication Data
US 2017/0312940 A1    Nov. 2, 2017

(30) Foreign Application Priority Data
Nov. 7, 2014    (DE) .................. 10 2014 116 270

(51) Int. Cl.
*B29B 11/16*    (2006.01)
*B29C 53/04*    (2006.01)

(52) U.S. Cl.
CPC .................. *B29B 11/16* (2013.01)

(58) Field of Classification Search
CPC ............. B29B 11/16; Y10T 156/1052; Y10T 156/1057; Y10T 156/1062
See application file for complete search history.

(56) References Cited

U.S. PATENT DOCUMENTS

2016/0361862 A1* 12/2016 Stahl .............. B29C 53/043

FOREIGN PATENT DOCUMENTS

| DE | 202014100927 U1 | 4/2014 |
| EP | 2633965 A2 | 9/2013 |
| EP | 2722145 A1 | 4/2014 |
| WO | 2010007416 A2 | 1/2010 |
| WO | 2010007417 A2 | 1/2010 |

* cited by examiner

*Primary Examiner* — Mark A Osele
*Assistant Examiner* — Christopher C Caillouet
(74) *Attorney, Agent, or Firm* — W&C IP

(57) ABSTRACT

The invention relates to a system (10) for the continuous production of a curved profiled preform (5) from flat, semi-finished fiber products (1), and to a method for this purpose, wherein first belt sections (3a, 3b) are formed by a shaping device and subsequently the semi-finished fiber product is sheared with the aid of two rollers (51, 52) which are arranged in the conveying direction at a distance from one another, wherein the web height of the curved profiled mold can be varied by linearly displaceable rollers (61, 62).

7 Claims, 3 Drawing Sheets

SYSTEM AND METHOD FOR THE CONTINUOUS PRODUCTION OF CURVED PREFORMS

FIELD OF THE INVENTION

The invention relates to a system for the continuous production of a curved profiled preform from planar semi-finished fibrous products, for the production of a fiber-composite component. The invention likewise relates to a method for the continuous production of a curved profiled preform from planar semi-finished fibrous products, for the production of a fiber-composite component.

BACKGROUND

Fiber-composite components, by virtue of the particularly advantageous property of having very high rigidity in at least one direction at a relatively low weight, are suitable for a multiplicity of application purposes. Fiber-composite components of this type herein are also increasingly employed for load-bearing structures in the automotive and aerospace section in order for fuel to be able to be saved by reducing the overall weight, for example. The spar of an airfoil or of a hull is an example thereof.

Fiber-composite components are typically formed by curing a matrix material, for example an artificial resin, that is infused into a semi-finished fibrous product. The load-bearing fibers of the fiber material that forms the basis of the semi-finished fibrous product that henceforth are embedded in the cured matrix material impart the enormous rigidity of the component in the direction of the fibers.

In order for the fiber-composite component that is to be produced later to obtain the desired component geometry thereof, the semi-finished fibrous product (dry or pre-impregnated) has to be brought into the desired component shape before any injected matrix material has fully cured. To this end, in particular in the case of complex component geometries, so-called preforms which have the later component geometry or are at least very similar to the latter are produced first. It is not uncommon herein for various preforms to be assembled so as to form an entire component. Such a preform can then be moved into a production jig, for example, where the former is injected with a matrix material and the matrix material together with the component is subsequently cured.

Complex component geometries of this type represent profiles which often have an elongate shape and not uncommonly are angled in the lateral regions so as to be able to dissipate stresses also outside the direction of the fibers. C-profiles or Z-profiles are examples thereof.

However, it is not uncommon in the aerospace industry for profiles of this type to have a curvature in the longitudinal direction, so as to follow the shape of the aircraft. Apart from the curvature of such a profiled preform, it is moreover not an uncommon requirement for the entire profiled preform to have a web height that is modified across the length so as to configure fastening points in an integral manner, for example.

A device and a method for the production of a curved preform in which one of the belts of the preform bears in a force-fitting manner on two roller elements that are disposed so as to be mutually spaced apart in the conveying direction and by way of a rotational speed differential cause shearing of the fibers of the semi-finished fibrous product is known from DE 10 2012 101 706 A1. The fibers of the semi-finished fibrous product on account of a higher rotational speed of that roller element that is disposed in the conveying direction so as to be downstream in relation to the upstream roller element are thus sheared in a defined manner between the two roller elements such that a predefined curvature of the preform in the longitudinal direction results.

A method and a device for the production of a preform are furthermore known from EP 2 722 145 A1, wherein shearing of the fibers is caused by two opposite roller elements having dissimilar rotational speeds, on the one hand, and the web height can be variably set in that the two roller elements that are provided on dissimilar belts of the profile are embodied so as to be movable relative to one another, on the other hand. However, in particular the fact that both shearing as well as the modification of the web height take place in a single process step is disadvantageous herein, this having proven disadvantageous in terms of the reproducibility of the method. Moreover, in the case of a movement of the rollers relative to one another during simultaneous shearing it can arise that the degree of shearing can no longer be predicted in a process-reliable manner. However, deviations from the nominal shape are permissible only in tight dimensional tolerances in particular in the case of load-bearing structures.

SUMMARY

It is therefore the object of the present invention to state an improved system and an improved method for the production of a curved profiled preform, by way of which system and method both a curvature can be incorporated into the profiled preform and a web height can be modified during the production of the preform in a process-reliable manner, specifically in such a manner that both the curvature as well as the modification of the web height lead to consistently reproducible results.

The object is achieved according to the invention by the system according to claim 1.

According to claim 1, a system for the continuous production of a curved profiled preform from planar semi-finished fibrous products is proposed, wherein the system first has a fiber supply installation which is configured for providing the semi-finished fibrous products. A fiber supply installation of this type can be a roll on which the planar semi-finished fibrous product is rolled up, for example. The semi-finished fibrous product provided by way of a conveying device is infed to a forming installation which is configured for forming the planar semi-finished fibrous product. Herein, during forming a first belt portion is formed from a first lateral portion of the semi-finished fibrous product, and a second belt portion is formed from a second lateral portion of the semi-finished fibrous product, on account of which the desired profiled shape can be produced. The forming installation herein is configured such that the former defines the belt portions by bending the lateral portions of the semi-finished fibrous products out of the plane of the planar semi-finished fibrous products. The belt portions herein are typically the two lateral peripheries of the semi-finished fibrous product. A so-called web portion which interconnects the two belt portions is formed herein between the two belt portions.

The semi-finished fibrous product is now sheared by means of a shearing installation such that the curvature of the profiled preforms to be produced can be formed. To this end, one of the belt portions is guided on two rotating roller elements that are disposed so as to be mutually spaced apart in the conveying direction and bear in a force-fitting manner on the belt portion and by virtue of a set rotational speed differential cause shearing of the fibers of the semi-finished fibrous product between the two roller elements. Rotational speed differential is understood as the two rotational speeds of the first and of the second roller element being mutually dissimilar, in particular in such a manner that the second roller element which is disposed in the conveying direction behind the first roller element has a rotational speed that is faster than that of the first roller element.

It is achieved with the aid of the shearing installation that the semi-finished fibrous product is sheared in a defined manner in particular in that belt region on which the two roller elements of the shearing installation bear in a force-fitting manner, wherein the curvature in the case of the continuous production of the curved preform is settable by varying the rotational speed differential. The fibrous material is sheared in a defined manner between the roller elements and on account thereof is elongated such that a curvature in the profile results from the elongation in one belt.

The sheared semi-finished fibrous product, in particular the formed and curved profiled preform, is subsequently infed to a cross-sectional modification installation which is different from the shearing installation and likewise has two rotating roller elements. The two roller elements herein are disposed such that the former in each case bear in a force-fitting manner on one belt portion of the profiled preform. The first roller element of the cross-sectional modification installation can thus bear in a force-fitting manner on the first belt portion, while the second roller element bears in a force-fitting manner on the second belt portion. At least one of the roller elements, or else preferably both, is/are configured such that said roller element(s) is/are embodied so as to be movable transversely to the conveying direction, in particular perpendicularly to the conveying direction, such that the web height of the web portion that is defined between the two belt portions by virtue of a movement transverse to the conveying direction of one of the roller elements can be continuously modified in the production process.

With the aid of a controller installation which is connected to both the shearing installation as well as to the cross-sectional modification installation, the rotational speed differential can be controlled, on the one hand, and the movement transverse to the conveying direction of the roller elements of the cross-sectional modification installation, on the other hand, such that the settable process parameters of curvature and web height can be continuously set during the forming process. On account thereof, profiled preforms having dissimilar curvature radii and different web heights can be produced in a defined and reproducible manner in a single continuous production method.

By separating shearing from the cross-sectional modification, the advantage that the modification of the web height is carried out only once defined shearing for producing the curvature has been completed is moreover achieved, such that the two processes in terms of the boundary parameters thereof can be considered in a mutually separate manner.

The inventors have recognized herein that a modification of the web height of the curved profiled preform is subsequently still possible without thereby modifying the curvature radius and without influencing shearing in specific part-regions, despite a curvature having been incorporated into the profiled preform.

According to one advantageous embodiment, at least one of the roller elements, in order for a roller element pair to be formed, has an opposite counter-rotating roller element, wherein the respective portion of the semi-finished fibrous product is conveyed in the conveying direction between the counter-rotating roller elements of the roller element pair. Transportation of the semi-finished fiber products that is as low in slippage as possible can in particular be guaranteed by the semi-finished fibrous product bearing in a force-fitting manner between the two roller elements of the roller element pair.

According to one advantageous embodiment, in order for a respective roller element pair to be formed, to this end each of the roller elements of the shearing installation and of the cross-sectional modification installation has one opposite counter-rotating roller element such that the respective belt portion is guided through the roller elements of a respective roller element pair.

According to one further advantageous embodiment, at least one of the roller elements, preferably all roller elements of the shearing installation and of the cross-sectional modification installation, has/have a first roller element portion and at least one further second roller element portion, wherein the first roller element portion has a diameter that is consistent across the length, while the second roller element portion has a diameter this is variable across the length. On account thereof, the advantage is achieved that when the respective belt portion is conveyed on the roller element bearing in a force-fitting manner, the latter takes into account the radius of the bending of the belt portion and thus facilitates forming in particular in the case of the modification of the web height.

It is thus conceivable, for example, that in the case of a roller element pair that is composed of two counter-rotating roller elements the first roller element of the roller element pair has a protruding collar which has a radius which corresponds to the radius of the bending of the belt portion. By contrast, the opposite counter-rotating second roller element has a cap which engages in the collar of the opposite counter-rotating roller element. A semi-finished fibrous product that is guided therebetween in terms of the bending thereof is conveyed in a process-reliable manner.

According to one advantageous embodiment, the sleeve area of the first roller element portion to this end has a coefficient of friction that is higher than that of the sleeve area of the second roller element portion. It is thus conceivable, for example, that the sleeve area of the first roller element portion comprises a material that is configured for conveying the semi-finished fibrous product in a force-fitting manner by means of static friction. By contrast, the sleeve area of the second roller element portion comprises a material in which the semi-finished fibrous product is guided by means of dynamic friction such that intended slippage arises in this region. Friction which would result in damage to the semi-finished fibrous product would otherwise arise by virtue of the variable diameter of the second roller element portion.

The sleeve area of the first roller element portion can thus be composed of an elastomer or a rubber material, or comprise such a material, while the sleeve area of the second roller element portion can comprise a metallic material such as stainless steel or aluminum, for example.

According to one further advantageous embodiment, the system has a fiber angle sensor which is configured for determining a fiber angle of the sheared semi-finished fibrous product. The controller installation in this instance is configured such that the latter sets the rotational speed differential so as to depend on the fiber angle determined, so as to cause a predefined curvature of the profiled preform. Conclusions pertaining to the curvature of the fibrous material can be derived by means of the fiber angle determined, such that a respective nominal curvature can be regulated based on knowledge of the fiber angle.

A fiber angle sensor of this type can be an optical sensor, for example, in which the surface of the sheared semi-finished fibrous product is illuminated with the aid of light and is recorded with the aid of a camera, wherein the individual fibers can then be detected and the angle of the latter can be determined by means of an image processing unit.

The fiber angle sensor (in terms of the conveying direction) in this instance is advantageously disposed behind the shearing installation, particularly advantageously still ahead of the cross-sectional modification installation.

According to one advantageous embodiment, the fiber angle sensor herein can be disposed such that the latter detects the fiber angles of the fibers of that belt portion on which the roller elements or the roller element pairs, respectively, of the shearing installation bear in a force-fitting manner. The maximum shearing angle of the fibers in relation to the semi-finished fibrous product can be determined on account thereof.

According to one further advantageous embodiment, the system has a belt webbing infeed installation which is configured for infeeding and incorporating additional belt webbings from fibrous material into at least one belt portion. The additional belt webbings are in particular belt webbings having a fiber position of 0°, that is to say that the load-bearing fibers are oriented longitudinally along the profiled preform. Since the belt or the belts of the profiled preform, respectively, does/do not innately have a fiber position of 0° of this type, as said belt/belts could otherwise not be sheared, it can be achieved by the incorporation of additional belt webbings having a fiber position of 0° that the profiled preform and the fiber-composite component produced therefrom can also absorb forces in the longitudinal direction.

According to one advantageous embodiment, the belt webbing infeed installation to this end is configured in such a manner that the latter infeeds the additional belt webbings from fibrous material at one of the roller elements of the cross-sectional modification installation such that the roller elements of the cross-sectional modification installation are also used for incorporating the additional belt webbings from fibrous material into the belt portion of the profiled preform. The additional belt webbing herein can be fixed in a localized manner with the aid of an activated binding agent.

According to one further advantageous embodiment, the belt webbing infeed installation herein can be configured in such a manner that the latter sets a predefined position of the additional belt webbings in relation to the belt height of the respective belt portion such that various heights are settable. This is advantageous in particular when a plurality of profiled shapes are to be placed on top of one another, since no cavities that are repeated in a localized manner and which then can lead to a breakage in the curvature region of the belt portions are formed in the curvature radii.

According to one advantageous embodiment, a cutting installation which is configured for trimming the end contour of the belt portions of the curved profiled preform is provided in the conveying direction behind the cross-sectional modification installation. The end contours of each of the belt portions of the profiled preform can be trimmed to a respective height with the aid of flying blades, for example.

According to one further advantageous embodiment, at least one of the roller elements of the cross-sectional modification installation is disposed so as to be pivotable or tiltable in the rolling plane, wherein the rolling plane is defined by the semi-finished fibrous product that bears in a force-fitting manner and the semi-finished fibrous product plane of the latter. In particular, the roller element which is configured so as to be displaceable transversely to the conveying direction is herein configured so as to be pivotable or tiltable such that the process in the case of a modification of the web height can be facilitated by tilting or pivoting the roller element. In the case of a modification of the web height, the fibrous material in the belt portion has to carry out a movement coaxial to the roller elements, said movement being facilitated in a corresponding manner by pivoting or tilting the respective roller element.

According to one further advantageous embodiment, it is also conceivable that in the case of a roller element pair both roller elements are disposed and configured so as to be simultaneously pivotable or tiltable, so as not to compromise the conveying process.

According to one further advantageous embodiment, it is also conceivable that position information of the semi-finished fibrous product during shearing and/or during the cross-sectional modification is detected with the aid of a semi-finished fibrous product detection installation, wherein a nominal position in continuous preforming is regulated by pivoting or tilting one of the roller elements of the shearing installation and/or of the cross-sectional modification installation.

According to one further advantageous embodiment, an indexing installation which conveys the planar semi-finished fibrous product provided in a manner uniform across the entire width of the semi-finished fibrous product up to the forming installation and/or shearing installation is provided between the fiber supply installation and the forming installation, this being enabled in particular by rollers which are provided so as to bear in planar manner and across the entire width. It is achieved by way of an indexing installation of this type that a fiber angle is present that at all times is consistent up to the forming installation or up to the shearing installation, respectively, such that shearing can commence with reproducible and defined boundary parameters.

BRIEF DESCRIPTION OF THE DRAWINGS

The invention will be explained in more detail by means of the appended figures in which.

DETAILED DESCRIPTION

Figure 1:
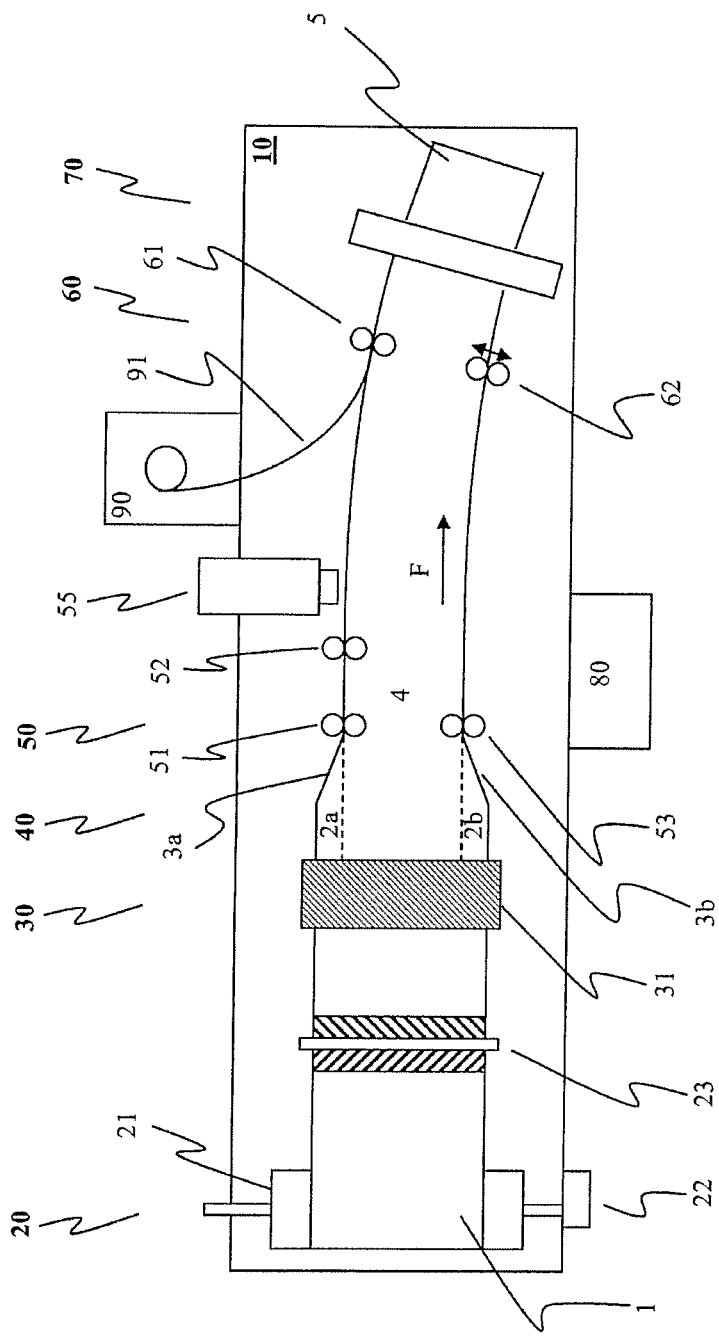
FIG. 1 shows a schematic illustration of the system according to the invention.

FIG. 1 schematically shows the system according to the invention for the production of a curved profiled preform. The profiled preform herein comprises a fibrous material, or is composed thereof, which is used for the production of fiber-composite components in which the fibrous material is infused with a matrix material, and the matrix material is subsequently cured. The curved profiled preform in the cross section herein in each case has belt portions which are bent by a central web portion. Herein, a curvature in the longitudinal direction is to be incorporated into the preform. Profiles of this type can be C-profiles or Z-profiles, for example.

The system 10 according to the invention for the production of such a curved profiled preform from planar semi-finished fibrous products has a fiber supply installation 20 which has a roll 21 on which the planar semi-finished fibrous product 1 is provided to the system 10.

The roll 21 is rotatably driven by way of a motor 22 such that the planar semi-finished fibrous product 1 is infed to the individual further stations of the system 10 in as tension-free a manner as possible. In order to be able to equalize variations in the infeed speed, a jockey roller 23 which homogenizes and synchronizes infeeding by way of lift compensation is disposed so as to be downstream of the roller 21 in the conveying direction F. The jockey roller 23 herein can be detected by way of a sensor system such that the motor 22 of the fiber supply installation 20 can be actuated depending on the detected lift.

The planar semi-finished fibrous product 1 is provided to the indexing installation 30 in this manner. The indexing installation 30 has an indexing roller 31 which extends across the entire width of the planar semi-finished fibrous product 1 and infeeds the planar semi-finished fibrous product to the forming installation 40 so as to be consistent and uniform across the entire width. It is achieved herein by way of the indexing roller 31 that extends across the entire width of the planar semi-finished fibrous product 1 that infeeding of the planar semi-finished fibrous product 1 to the forming installation 40 is at all times performed at the fiber angle that is consistent across the entire width of the planar semi-finished fibrous product such that both forming as well as subsequent shearing can proceed from constant boundary conditions in terms of the fiber angle.

The lateral portions 2a, 2b of the planar semi-finished fibrous product 1 are bent by means of the forming installation 40 such that respective belt portions 3a, 3b are formed. Forming herein is performed by means of the forming installation 40 in such a manner that the lateral portions 2a, 2b are bent from the planar semi-finished fibrous product 1 so that a web portion 4 is defined between the belt portions 3a, 3b formed. Forming herein can be performed by means of rollers or guide rails or the like.

The semi-finished fibrous product 1 such formed is now infed to the downstream shearing installation 50 which has two roller element pairs 51 and 52 that are disposed so as to be mutually spaced apart in the conveying direction F. The respective belt portion, this in the exemplary embodiment of FIG. 1 being the belt portion 3a, is guided between the roller elements of the roller element pairs, wherein the belt portion 3a bears in a force-fitting manner on the roller elements of the two roller element pairs 51 and 52.

The roller elements of the two roller element pairs 51 and 52 herein rotate at dissimilar rotational speeds such that a rotational speed differential is established between the roller elements of the roller element pair 51 and the roller elements of the roller element pair 52, said rotational speed differential leading to shearing of the fibers of the semi-finished fibrous product 1 between the roller element pairs 51 and 52. Shearing herein is at maximum in that belt portion 3a on which the roller element pairs 51 and 52 bear in a force-fitting manner, said shearing extending in a uniformly decreasing manner toward the belt portion 3b where shearing is at minimum or does no longer arise at all, respectively.

Moreover, at least one further roller element pair 53 which bears in a force-fitting manner on the second belt portion 3b and advantageously has the rotational speed of the first roller element pair 51 of the first belt portion 3a can be disposed on the opposite belt portion 3b.

A defined curvature in the longitudinal direction which ultimately depends on the rotational speed differential of the two roller element pairs 51 and 52 is incorporated into the semi-finished fibrous product 1 by shearing the fibrous material between the two roller elements 51 and 52.

The semi-finished fibrous product such sheared is now infed to a cross-sectional modification installation which in the conveying direction F is downstream of the shearing installation 50. The cross-sectional modification installation 60 has at least two roller element pairs 61 and 62, wherein the first roller element pair 61 by way of the roller elements thereof bears in a force-fitting manner on the first belt portion 3a, while the second roller element pair 62 by way of the roller elements thereof bears in a force-fitting manner on the second belt portion 3b. Herein, at least the roller element pair 62 is disposed so as to be displaceable transversely to the conveying direction F such that the distance between the roller element pair 61 and the roller element pair 62 can be modified. More specifically, the roller element pair 62 in the exemplary embodiment of FIG. 1 is configured such that it can move away from the web portion 4 of the semi-finished fibrous product 1 or move toward the latter. It is achieved on account thereof that the web height of the web portion 4 can be modified in order for curved profiled preforms having a variable web height to be able to be produced. The web height herein is defined as the extent between the first belt portion 3a and the second belt portion 3b.

The curved profiled preform is subsequently infed to a cutting installation 70 which trims the end contours of the belt portions 3a, 3b such that the latter have substantially the same belt height or a belt height of defined dissimilarity.

The entire system 10 is controlled with the aid of a controller installation 80, wherein the controller installation 80 is connected in particular to the shearing installation 50 of the cross-sectional modification installation 60 and is adapted for setting the rotational speed differential between the two roller element pairs 51 and 52 according to a predefined nominal curvature, on the one hand, and moreover for actuating the movement of the at least one roller element pair 62 of the cross-sectional modification installation 60 so as to set the desired nominal web height of the web portion 4.

The system 10 can have a fiber angle sensor 55 which is downstream of the two roller element pairs 51 and 52 and detects a fiber angle of the sheared fibers in the first belt portion 3a, By means of the fiber angle of the sheared fibers such detected, the controller installation 80 can then set the rotational speed differential between the two roller element pairs 51 and 52 such that the desired curvature can be produced. The curvature of the preform is thus directly correlated to the fiber angle of the sheared fibers.

A belt webbing infeed installation 90 which by way of the roller element pair 61 of the cross-sectional modification installation 60 incorporates an additional belt webbing from fibrous material having a zero degree position of the reinforcement fibers into the outer belt 3a (first belt portion) can furthermore be provided. Herein, a binding agent material can be activated by thermal input, for example, such that the additional belt webbing 91 is fixed to the outside of the first belt portion 3a.

Figure 2:
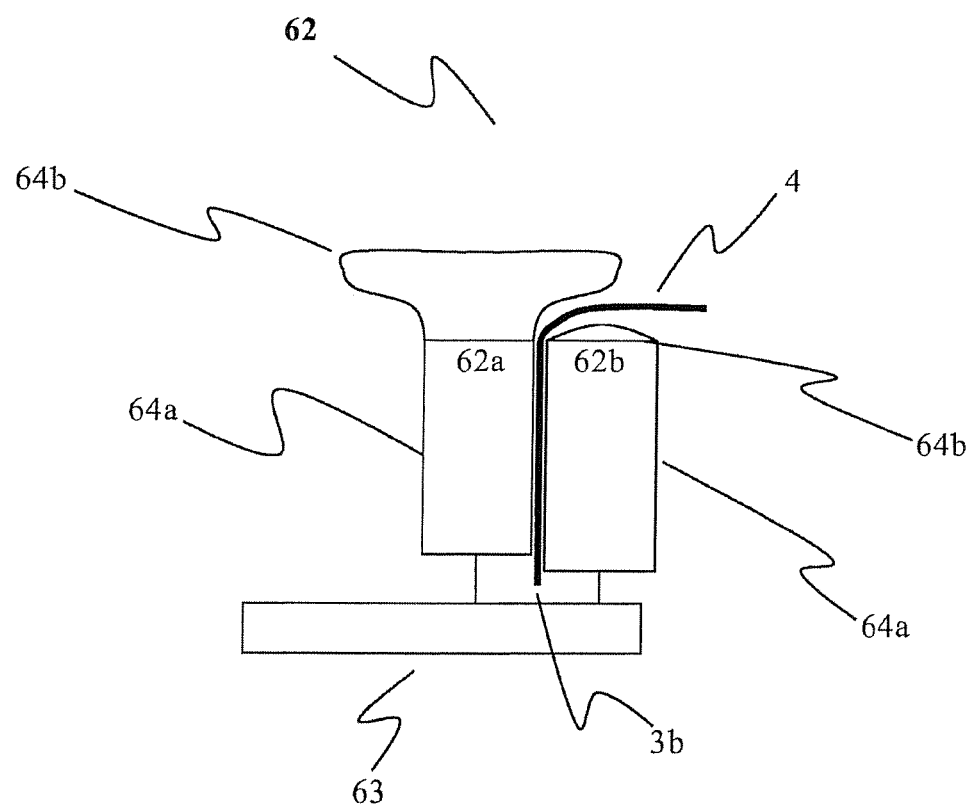
FIG. 2 shows a schematic illustration of a roller element pair.

FIG. 2 schematically shows the roller element pair 62 which is a component part of the cross-sectional modification installation 60 and by way of a linear displacement is moreover provided for varying the web height. The roller element pair 62 has two counter-rotating roller elements 62a and 62b, wherein the second belt portion 3b bears in a force-fitting manner on the roller elements between the roller elements 62a and 62b. The two roller elements 62a and 62*b* can be displaced transversely to the conveying direction of the semi-finished fibrous products with the aid of a linear motor 63.

A displacement of the roller element pair 62 to the left thus leads to the height of the belt portion 3*b* being reduced and the semi-finished fibrous product sliding upward in relation to the roller elements 62*a* and 62*b*. The web height is increased in this case. When displaced to the right, the semi-finished fibrous product slides downward, the belt portion 3*b* being enlarged and the web height being reduced on account thereof.

The two roller elements 62*a* and 62*b* have a first roller element portion 64*a* and a second roller element portion 64*b*. The first roller element portion 64*a* herein has a substantially consistent diameter that is constant across the length of the roller element portion 64*a* such that the roller element portion 64*a* of the roller element 62*a* has a cylindrical shape having a constant cross section. The second roller element portion 64*b* which has a variable diameter, on account of which a kind of collar is created on the roller element 62*a*, is located at the upper end of the roller element 62*a*. A kind of cap is shaped in a corresponding manner thereto on the roller element 62*b* in the region of the second roller element portion 64*b*.

The curvature radius of the semi-finished product that defines the transition from the web portion 4 to the belt portion 3*b* is post-formed by the variable diameter of this second roller element portion 64*b*. On account thereof, the forming process per se is further facilitated, on the one hand, and it is moreover prevented that the fibrous material breaks by virtue of an excessively tight curvature radius.

The first roller element portion 64*a* having the constant diameter herein has a sleeve area which has a very high coefficient of friction, on account of which the belt portion 3*b* can be guided through the two roller elements 62*a* and 62*b* in as slippage-free a manner as possible or with as little slippage as possible, respectively. Such a material can be rubber, for example. By contrast, the second roller element portion 64*b* having the variable diameter has a sleeve area which has a very low coefficient of friction so as to enable guiding of the semi-finished fibrous product by means of dynamic friction in this area. Such a sleeve area can be composed of stainless steel, for example.

In order for the process of varying the web height to be facilitated it is advantageous for the roller element pair 62 in the linear displacement that is transverse to the conveying direction to be simultaneously tilted or pivoted in the conveying direction or counter to the conveying direction (this in the exemplary embodiment of FIG. 2 being out of the illustration plane), so as to facilitate the vertically directed transportation of the belt portion 3*b* between the two roller elements 62*a* and 62*b*.

However, it is also conceivable for other roller element pairs of the system 10 to be embodied in a tilted or pivotable manner, specifically in the respective semi-finished fibrous product plane of the bearing semi-finished fibrous product part, so as to enable height-regulated guiding of the preform along the roller element pairs. To this end it is conceivable that the position of the preform is detected by means of a sensor, for example of a laser stripe sensor, and the roller element pairs depending on the position of the preform are actuated for pivoting or tilting such that a predefined nominal position of the preform is regulated during continuous preforming.

The fundamental construction of a roller element pair as is shown in FIG. 2 can also be applied to all other roller element pairs of the system 10 herein, such that the roller element pairs 51, 52, 53, and 61 are constructed according to the same principle as illustrated in FIG. 2.

Figure 3:
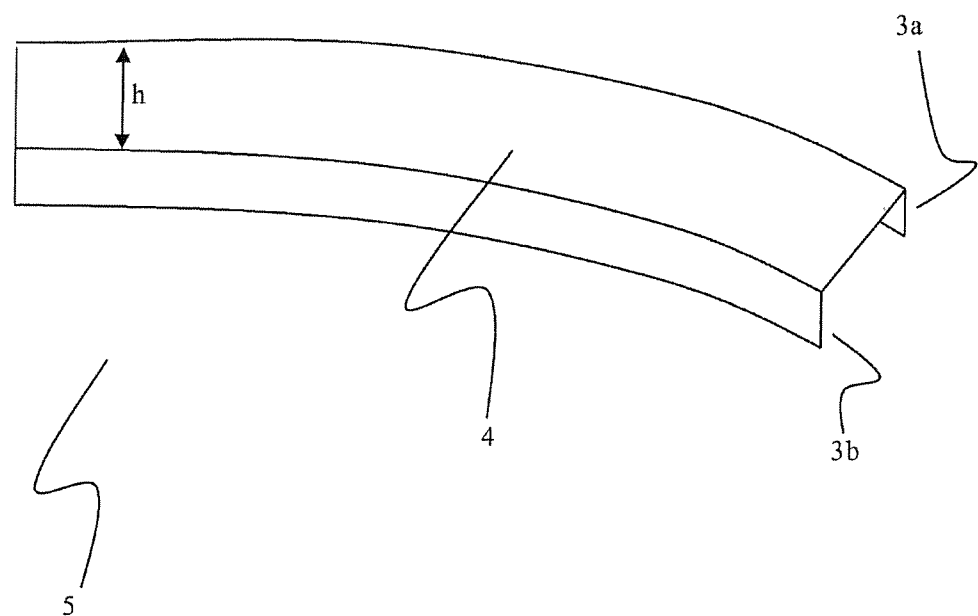
FIG. 3 shows a perspective illustration of a preform profile.

FIG. 3 schematically shows the completely produced curved profiled preform 5 which has a first belt portion 3*a* as the outer belt, a second belt portion 3*b* as the inner belt, and an interdisposed web portion 4, wherein the web height h increases from the left to the right. A curved profiled preform of this type, having a complex cross section across the entire length, is producible in a process-reliable manner by way of the system according to the invention and the method according to the invention.

LIST OF REFERENCE SIGNS

1 Planar semi-finished fibrous product
2*a* First lateral portion
2*b* Second lateral portion
3*a* First belt portion
3*b* Second belt portion
4 Web portion
5 Curved profiled preform
10 System
20 Fiber supply installation
21 Semi-finished fibrous product roll
22 Drive of the fiber supply installation
23 Jockey roller
30 Indexing installation
31 Indexing roller
40 Forming installation
50 Shearing installation
51 First roller element pair
52 Second roller element pair
53 Additional roller element pair
55 Fiber angle sensor
60 Cross-sectional modification installation
61 First roller element pair
62 Linearly displaceable second roller element pair
70 Cutting installation
80 Controller installation
90 Belt webbing infeed installation
91 Additional belt webbings
62*a*, 62*b* Roller element of the linearly displaceable second roller element pair 62
64*a* First roller element portion
64*b* Second roller element portion

The invention claimed is:

1. A system for the continuous production of a curved profiled preform from planar semi-finished fibrous products, for the production of a fiber-composite component, said system comprising a fiber supply installation which is configured for providing the semi-finished fibrous products;

a forming installation which is configured for forming a first belt portion from a first lateral portion of the semi-finished fibrous product and for forming a second belt portion from a second lateral portion;

a shearing installation which has at least two rotating roller elements that are disposed so as to be mutually spaced apart in a conveying direction and are configured so as to bear in a force-fitting manner on one of the belt portions and to interact with the latter in such a manner that shearing of the fibers between the roller elements in order for the curvature of the profiled preform to be formed is caused by a rotational speed differential set between the roller elements;

a cross-sectional modification installation which is different from the shearing installation and which has a first rotating roller element which bears in a force-fitting manner on the first belt portion and has a second rotating roller element which bears in a force-fitting manner on the second belt portion, wherein at least one of the roller elements is disposed so as to be transverse to the conveying direction and interacts with the respective belt portion in such a manner that a web height modification of a web portion that is defined between the belt portions is caused during the production of the curved profiled preform by a movement of the roller element that is transverse to the conveying direction; and a controller installation which is adapted for actuating the shearing installation in order for the rotational speed differential to be set and for actuating the cross-sectional modification installation in order for the web height of the web portion to be set, wherein at least one of the roller elements has a first roller element portion and at least one second roller element portion, wherein the first roller element portion has a diameter that is consistent across the length, while the second roller element portion has a diameter that is variable across the length.

2. The system as claimed in claim 1, wherein the sleeve area of the first roller element portion has a coefficient of friction that is higher than that of the sleeve area of the second roller element portion.

3. A system for the continuous production of a curved profiled preform from planar semi-finished fibrous products, for the production of a fiber-composite component, said system comprising a fiber supply installation which is configured for providing the semi-finished fibrous products;

a forming installation which is configured for forming a first belt portion from a first lateral portion of the semi-finished fibrous product and for forming a second belt portion from a second lateral portion;

a shearing installation which has at least two rotating roller elements that are disposed so as to be mutually spaced apart in a conveying direction and are configured so as to bear in a force-fitting manner on one of the belt portions and to interact with the latter in such a manner that shearing of the fibers between the roller elements in order for the curvature of the profiled preform to be formed is caused by a rotational speed differential set between the roller elements;

a cross-sectional modification installation which is different from the shearing installation and which has a first rotating roller element which bears in a force-fitting manner on the first belt portion and has a second rotating roller element which bears in a force-fitting manner on the second belt portion, wherein at least one of the roller elements is disposed so as to be transverse to the conveying direction and interacts with the respective belt portion in such a manner that a web height modification of a web portion that is defined between the belt portions is caused during the production of the curved profiled preform by a movement of the roller element that is transverse to the conveying direction;

a controller installation which is adapted for actuating the shearing installation in order for the rotational speed differential to be set and for actuating the cross-sectional modification installation in order for the web height of the web portion to be set; and a belt webbing infeed installation which is configured for infeeding and incorporating additional belt webbings from fibrous material into at least one belt portion.

4. The system as claimed in claim 3, characterized in that the belt webbing infeed installation infeeds the additional belt webbings at the first and/or the second roller element of the cross-sectional modification installation, and incorporates the additional belt webbings into the respective belt portion by way of the first and/or the second roller element of the cross-sectional modification installation.

5. The system as claimed in claim 3, wherein the belt webbing infeed installation is configured for setting a predefined position of the additional belt webbings in relation to the belt height of the respective belt portion.

6. A method for the continuous production of a curved profiled preform from planar semi-finished fibrous products, for the production of a fiber-composite component, said method comprising the following steps:

providing a planar semi-finished fibrous product;

forming the planar semi-finished fibrous product such that a first belt portion is formed from a first lateral portion of the semi-finished fibrous product, and a second belt portion is formed from a second lateral portion of the semi-finished fibrous product;

shearing the semi-finished fibrous product in that two rotating roller elements that are disposed so as to be mutually spaced apart in a conveying direction bear in a force-fitting manner on one of the belt portions, and a rotational speed differential between the two roller elements is set such that shearing of the fibers between the roller elements in order for the curvature of the profiled preform to be produced is caused; and subsequently modifying a web height of a web portion that is defined between the belt portions, in that two roller elements in each case bear in a force-fitting manner on one belt portion, and at least one of the roller elements is moved transversely to the conveying direction such that a predefined web height is set; and incorporating additional belt webbings from fibrous material into at least one belt portion.

7. The method as claimed in claim 6, further comprising setting a predefined position of the additional belt webbings in relation to the belt height of the respective belt portion.

* * * * *